United States Patent
Tenze et al.

(10) Patent No.: US 6,819,804 B2
(45) Date of Patent: Nov. 16, 2004

(54) NOISE REDUCTION

(75) Inventors: Livio Tenze, Trieste (IT); Sergio Carrato, Cervignano (IT); Stefano Olivieri, Teramo (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 620 days.

(21) Appl. No.: 09/759,041

(22) Filed: Jan. 11, 2001

(65) Prior Publication Data

US 2001/0019633 A1 Sep. 6, 2001

(30) Foreign Application Priority Data

Jan. 13, 2000 (EP) .............................. 00200103
Feb. 29, 2000 (EP) .............................. 00200718

(51) Int. Cl.[7] .............................. G06K 9/40; H04N 5/21
(52) U.S. Cl. .................................. 382/262; 348/607
(58) Field of Search ............................... 382/254, 205, 382/260, 261, 262, 263–275; 348/571, 606, 607

(56) References Cited

U.S. PATENT DOCUMENTS

| | | | | |
|---|---|---|---|---|
| 4,530,076 A | * | 7/1985 | Dwyer | 367/135 |
| 5,057,795 A | * | 10/1991 | Napier | 331/78 |
| 5,210,820 A | * | 5/1993 | Kenyon | 704/200 |
| 5,379,074 A | * | 1/1995 | Hwang | 348/606 |
| 5,490,094 A | * | 2/1996 | Heimburger et al. | 348/607 |
| 6,249,749 B1 | * | 6/2001 | Tran et al. | 702/66 |

FOREIGN PATENT DOCUMENTS

| | | | |
|---|---|---|---|
| FR | 2575886 | 7/1986 | H04N/5/217 |
| JP | 06315104 | 8/1993 | H04N/5/21 |
| JP | 09233369 | 2/1996 | H04N/5/208 |

OTHER PUBLICATIONS

Francesco Cocchia, Sergio Carrato, and Giovanni Ramponi (Design and real–time implementation of a 3–d rational filter for edge preserving smoothing, IEEE 1997, pp. 408–409).*
S. Pagnan, C. Ottonello, and G. Tacconi (Filtering of randomly occurring signals by kurtosis in the frequency domain IEEE 1994, pp. 131–133).*

* cited by examiner

Primary Examiner—Bhavesh M. Mehta
Assistant Examiner—Kanji Patel
(74) Attorney, Agent, or Firm—Edward W. Goodman

(57) ABSTRACT

Noise filtering (3) of a signal (x) is effected by estimating (30) a type of noise in the signal (x) and enabling (30) one of at least two noise filters (310, 311, 312), the enabled noise filter (310,311,312) being a most suitable filter for the estimated type of noise. An approximation of the noise (z) in the signal (x) is obtained by computing (302) a difference between the signal (x) and a noise-filtered (301) version of the signal (x). A kurtosis of the noise is used as a metric for estimating the type of noise. If the estimated type of noise is long-tailed noise, a median filter (312) is enabled to filter the signal. If the estimated type of noise is Gaussian noise or contaminated Gaussian noise, a spatio-temporal filter (310,311) is enabled to filter the signal.

12 Claims, 2 Drawing Sheets

NOISE REDUCTION

BACKGROUND OF THE INVENTION

1. Field of the Invention

The invention relates to a method and a device, in which noise filtering is applied. The invention further applies to a video system.

2. Description of the Related Art

There is presently an increasing interest in digital transmission of image sequences, e.g., through the Internet. Especially in the consumer electronics area, the sources of these images, such as, video cameras, video recorders, satellite receivers and others, are affected by various types of noise. In particular, in the case of CCD and CMOS cameras, the sensor noise is usually modeled as white Gaussian, whereas vertical or horizontal streaks may be found in video scanned from motion picture films or played by a video recorder, respectively. Before storage and/or transmission, it is advisable to reduce the noise level in the images, both to improve the visual appearance and to reduce the bit rate. Various algorithms are known in the art for the attenuation of noise having different distributions, these algorithms being generally very complex and, consequently not being amenable to real-time implementation in consumer equipment, or providing poor performance, typically introducing artifacts and smoothing edges.

SUMMARY OF THE INVENTION

An object of the invention is to provide less complex noise reduction. To this end, the invention provides a method of and a device for noise filtering and a video system.

In a first embodiment of the invention, a type of noise in the signal is estimated, and one of at least two noise filters is enabled, the enabled noise filter being one most suitable for the estimated type of noise. The invention is based on the insight that estimating a type of noise and automatically enabling one filter out of a set of simple filters, each favorable to a specific noise type, is more effective than a complex filter which has to cope with different noise characteristics. Both the noise type estimation and the filters have a low complexity and are amenable for low-cost applications.

Edge preserving noise reduction can be achieved using spatio-temporal rational and median-based filters. A rational filter is a filter described by a rational function, e.g., the ratio of two polynomials in input variables. It is well known that spatio-temporal rational filters can effectively distinguish between details and homogeneous regions by modulating their overall low-pass behavior according to the differences of suitably chosen pixels (see Ref. [1]), so that noise is significantly reduced while details are not blurred. They are effective on various types of noise, including Gaussian noise (Ref. [1]) and contaminated Gaussian noise (Ref. [2]). Contaminated Gaussian noise has a probability distribution according to:

$$v \sim (1-\lambda)N(\sigma_n) + \lambda N\left(\frac{\sigma_n}{\lambda}\right) \quad (1)$$

wherein $\lambda$ is a parameter and $N(\sigma)$ is a Gaussian distribution with variance $\sigma$. A variance of the contaminated Gaussian distribution is given by:

$$\sigma_v^2 = \sigma_n^2(1-\lambda+1/\lambda) \quad (2)$$

In case of long-tailed noise, a simple median filter (Ref. [3]) is used, which is effective both for single noisy pixels and for horizontal and vertical streaks, so that there is no need to distinguish between ideal and real impulsive noise. Median-based operators are very efficient in case of long-tailed noise, especially impulsive noise, while their use in case of Gaussian noise is not advisable, because they tend to generate streaking and blotching artifacts.

A further embodiment of the invention uses a simple algorithm to estimate the type of noise in the image sequence. This embodiment uses a kurtosis of the noise as a metric for the type of noise. The kurtosis is defined as (Ref. [4]):

$$k = \mu_4/\sigma^4 \quad (3)$$

where $\mu_4$ is a fourth central moment of the data, and $\sigma$ is a variance of the data in the image sequence. The fourth central moment is given by:

$$\mu_4 = E(x-\bar{x})^4 \quad (4)$$

where E is an expectation of a variable and $E(x)=\bar{x}$. The fourth central moment $\mu_4$ is related to the peakedness of a single-peaked distribution. The kurtosis is dimensionless with k=3 for a Gaussian distribution. A kurtosis value of 3 therefore means that the noise distribution has, in some sense, a same degree of peakedness as a member of the normal family. Further, k>3 for contaminated Gaussian noise, and K>>3 for impulsive noise.

Prior art operators which are able to distinguish among several types of noise, are very complex. For example, in Ref. [5], a block-based, non-linear filtering technique, based on Singular Value Decomposition that employs an efficient method of estimating noise power from input data, is presented. However, an hypothesis of additive noise is required, and only Gaussian distributions are used. In Ref. [6], in order to detect and estimate both deterministic and random Gaussian signals in non-Gaussian noise, the covariance of the latter is determined using higher order cumulants. The inverse problem is treated in Ref. [7], where signal detection and classification in the presence of additive Gaussian noise is performed using higher-o:-der statistics.

The input signal x is formed by an original noise-free signal y and a noise signal n according to: x=y+n. In a further embodiment of the invention, the noise n is approximated by computing a difference between the signal x and the same signal being noise filtered, preferably in a median filter (Ref. [8]). A median of N numerical values is found by taking a middle value in an array of the N numerical values sorted in increasing order. A median filter may also be referred to as a non-linear shot noise filter, which maintains high frequencies. Due to the well-known noise reduction and edge preserving properties of the median filter, the resulting signal, z=x−median(x), is composed approximately of noise only, i.e., z≈n. The kurtosis k is then estimated on z to provide an indication of the type of noise. Although z does not coincide with the original noise n, for reasonable values of the noise variance (in case of Gaussian noise or contaminated Gaussian noise) or of a percentage of noisy pixels (in case of impulsive noise), the parameter k allows to correctly discriminate the types of noise, using two suitable thresholds. There is no overlap in values of the parameter k for Gaussian, contaminated Gaussian and long-tailed noise, so that it is actually possible to correctly discriminate the various noise types using two thresholds, being 6 and 15.

Preferably, because the noise is supposed to be spatially uniform, a small part of each image (e.g., 3 by 3 pixels sub-image) is analyzed, in order to keep the computational load per image low. Because a stable estimate is needed, an analysis is preferably performed by cumulating data for a plurality of images before actually computing k. An estimate over 900 pixels (i.e., over 100 frames) has a reasonable low variance.

The aforementioned and other aspects of the invention will be apparent from and elucidated with reference to the embodiments described hereinafter.

BRIEF DESCRIPTION OF THE DRAWINGS

In the drawings:

FIG. 2A: horizontal, FIG. 2B: vertical, FIGS. 2C and 2D: diagonal;

The drawings only show those elements that are necessary to understand the invention.

DESCRIPTION OF THE PREFERRED EMBODIMENTS

Figure 1:
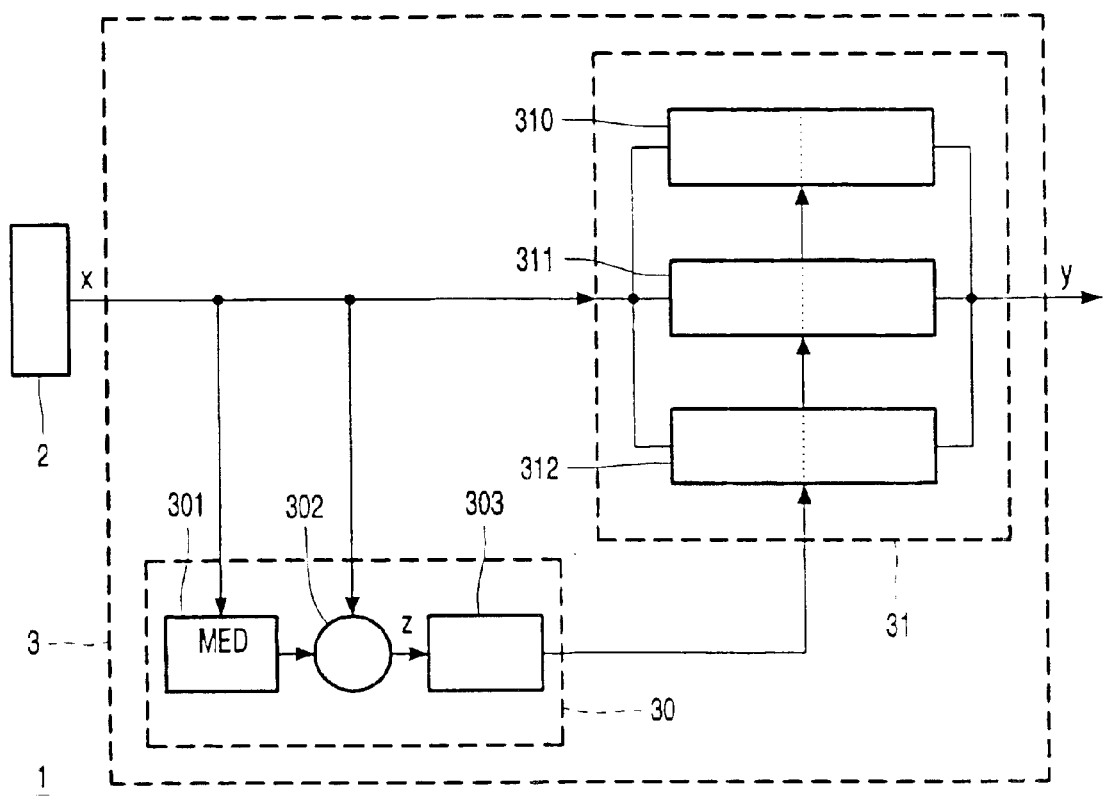
FIG. 1 shows an embodiment of a video system according to the invention.

FIG. 1 shows an embodiment of a video system 1 according to the invention. The video system 1 comprises an input unit 2, such as a camera or an antenna, for obtaining an image sequence x. The video system 1 further comprises a noise filter 3. The noise filter 3 comprises a noise discriminator 30 for estimating a type of noise in the image sequence x. The noise discriminator 30 controls a set of filters 31. Depending on the estimated type of noise, a most suitable filter in the set of filters 31 is enabled.

The noise discriminator 30 comprises a median filter 301, a subtractor 302 and a noise type estimator 303. The median filter 301 filters the input signal x to obtain a filtered version of x, being median(x). The filtered signal median (x) is subtracted from the input signal x, resulting in an approximation of the noise n in the input signal x, the approximation given by: z=x−median(x). The signal z is furnished to the noise type estimator 303 for estimating the type of noise. As described above, the noise type estimator 303 applies a kurtosis Ic on the noise signal z. The noise type estimator 303 furnishes a kurtosis (noise type) depending control signal to the set of filters 31. Depending on the control signal from the noise type estimator 303, one of the filters in the set of filters 31 is enabled. The output y of the noise filter 3 may be transmitted to a receiver or stored on a storage medium.

In a preferred embodiment, the set of filters 31 comprises three different filters 310, 311, 312 in order to be able to treat different types of noise. Their operation is automatically controlled by the noise discriminator 30 as described above. Preferably, their support is restricted to two temporally adjacent images only, to keep the computational complexity low. The use of only two images has the further advantage that the amount of required image memory is lower thin in methods that use more images. In this embodiment, the filter 310 is suitable for Gaussian noise, the filter 311 is suitable for contaminated Gaussian noise, and the filter 312 is suitable for long-tailed noise.

The filters for the Gaussian noise and the contaminated Gaussian noise 310, 311 are preferably spatio-temporal rational filters having a similar structure, constituted by the sum of a spatial and a temporal filtering part. Each filter output $y_0$ is computed as:

$$y_0 = x_0 - f_{spatial} - f_{temp} \quad (5)$$

with $$f_{spatial} = \sum_{i,j \in I} \frac{-x_i + 2x_0 - x_j}{k_s(x_i - x_j)^2 + A_s} \quad (6)$$

where $x_0$, $x_i$ and $x_j$ are pixel values within a mask ($x_0$ being the central one), i, j∈I describe a set of spatial filtering directions shown in FIGS. 2A–2D, and $k_s$ and $A_s$ are suitable filter parameters. The temporal filtering part, $f_{temp}$ has a similar form, although $f_{temp}$ operates also on pixels of a previous image, and is described below. It may be seen that the spatial filter is able to distinguish between homogeneous and detailed regions in order to reduce noise while maintaining thee image details. In fact, if the mask lies in a homogeneous region, the pixel differences $(x_i-x_j)^2$ which appear at the denominator are small, and the high-pass component present at the numerator, which is subtracted from $x_0$, gives an overall low-pass behavior. In turn, if the same differences have a large value, an edge is supposed to be present, and the filter leaves the pixel unchanged in order not to blur the detail.

Figure 3:
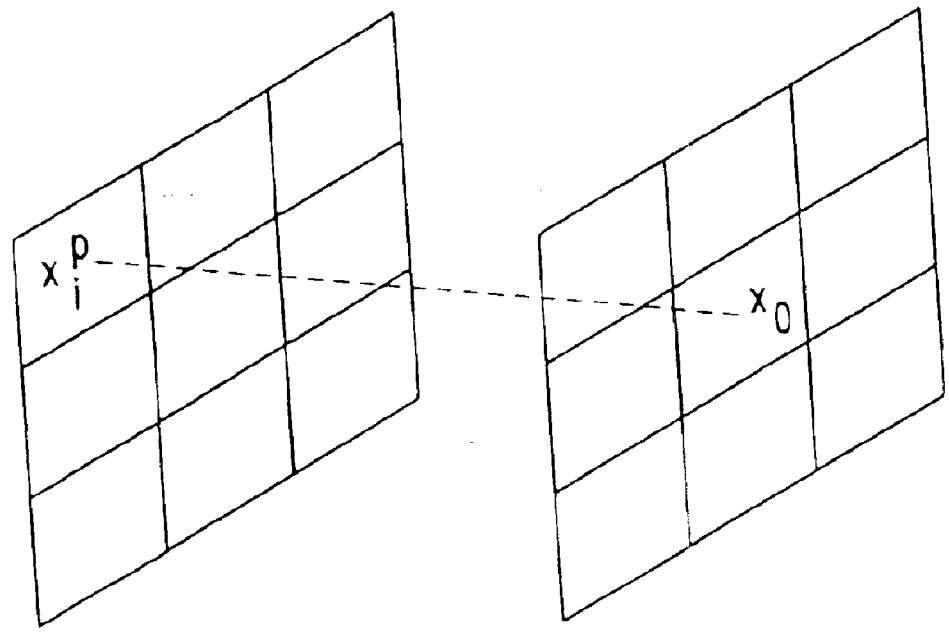
FIG. 3 shows an exemplary direction used by a temporal part of a rational filter for Gaussian noise.

The temporal part exploits the same principle of detail sensitive behavior, and for Gaussian noise, the form is similar to that of the spatial part:

$$f_{temp}^{(gauss)} = \sum_{i \in J} \frac{-x_i^p + x_0}{k_{t1}(x_i^p - x_0)^2 + A_{t1}} \quad (7)$$

where i∈J describes a set of temporal filtering directions as shown in FIG. 3. In FIG. 3 only one of 9 possible directions (according to the possible positions of $x_i^p$) has been drawn for the sake of clarity. The superscript p refers to pixels belonging to a previous image, and $k_{t1}$ and $A_{t1}$ are suitable filter parameters.

Figure 4:
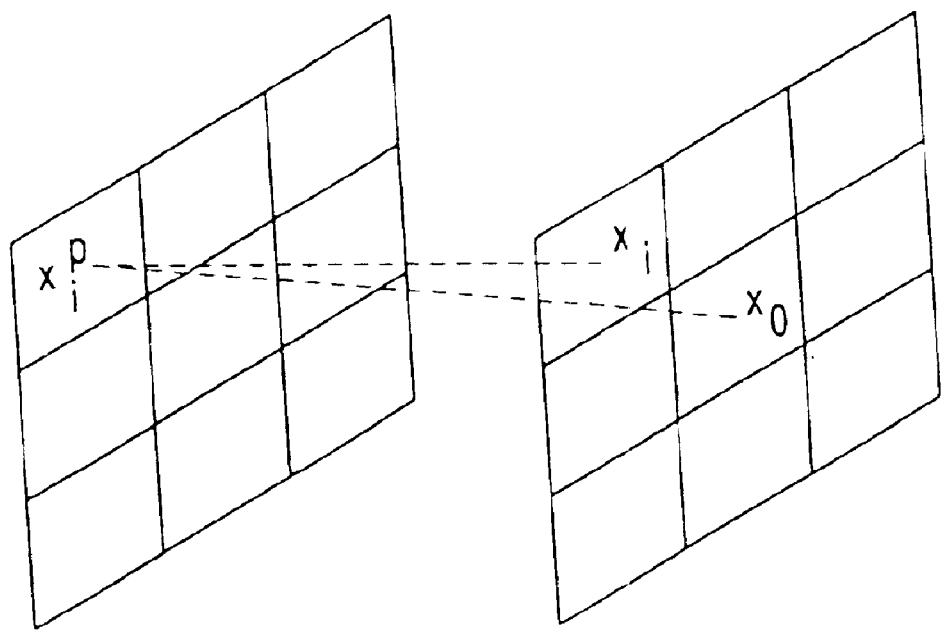
FIG. 4 shows an exemplary combination of directions used by a temporal part of a rational filter for contaminated Gaussian noise.

The situation is slightly more complicated for contaminated Gaussian noise. In this case, details and noise are more difficult to discriminate, because the pixel noise level can be large (due to the rather long tails of the distribution), and less information with respect to the spatial case is available; more precisely, due to the limited temporal size of the filter support (only two images), pixels are available only at one (temporal) side of $x_0$ (vice-versa, in the spatial part of the filter 311, pixels both at the right and at the left of $x_0$, or both on top of and below, are available), so that the simple denominator of the spatial part does not allow to distinguish between a single noisy pixel and the edge of an object. For contaminated Gaussian noise, $f_{temp}$ is defined as:

$$f_{temp}^{cont.Gauss} = \sum_{i \in J} \frac{-x_i^p + x_0}{[k_{t2}(x_i^p - x_0)^2 + k_{t3}(x_i^p - x_i)^2]/2 + A_{t2}} \quad (8)$$

where i∈J describes a set of temporal filtering combinations (a combination of a temporal direction with a spatial direction) as shown in FIG. 4, and where $k_{t2}$, $k_{t3}$ and $A_{t2}$ are suitable filter parameters. In FIG. 4, only one combination of $x_i^p$ and $x_i$ of a plurality of possible combinations has been drawn for the sake of clarity. In this case, the pixels at the denominator, which controls the strength of the low-pass action, are three instead of two, i.e., $x_i$, $x_i^P$ and $x_0$. In fact, as already mentioned above, it is not advisable to use the same control strategy as for Gaussian noise: the difference $(x_i^P-x_0)$ may be large due to a noise peak instead of an edge with consequent loss of the noise filtering action. In turn, if the same difference is corrected by aver aging with another difference, i.e., $(x_i^P-x_i)$, the denominator remains low also in presence of isolated noisy pixels, and the desired low-pass behavior is obtained.

Although the filters 311 and 311 are shown in FIG. 1 as separate filters, in a practical embodiment, the filters 310 and 311 are combined in one rational Filter with a common spatial part and different temporal parts, a first temporal part for Gaussian noise and a second temporal part for contaminated Gaussian noise. Depending on the type of noise estimated in the noise discriminator 30, the suitable temporal part is enabled. In a further practical embodiment, the first temporal pant and the second temporal part are implemented as one temporal filtering part according to equation (8), wherein, in case the noise has a Gaussian distribution, the parameter $k_{t3}$ is taken zero to obtain a rational filter according to equation (7).

The rational filter 310/311 is enabled if the value of the kurtosis k of z is lower than 15, otherwise the median filter 312 is enabled. If the kurtosis k is lower than 6, the first temporal part (for the Gaussian noise) is enabled. If the kurtosis k is between 6 and 15, the second temporal part (for the contaminated Gaussian noise) is enabled.

In order to treat long-tail noise effectively, the filter 312 is preferably a simple median filter. In general, a median filter is based on order statistics. A two-dimensional median filter is given by:

$$y_0 = \text{median}\{x_i, x_0, x_j\} \qquad (9)$$

Figure 2A:
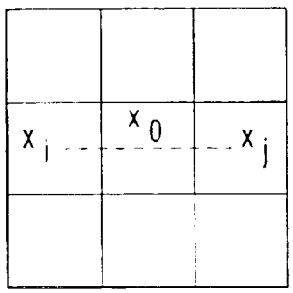
FIGS. 2A–2D show exemplary spatial directions considered in the filters.
Figure 2B:
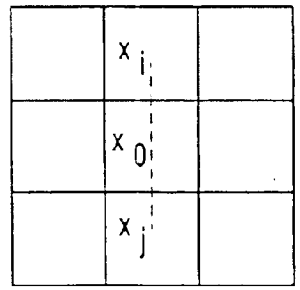
Figure 2C:
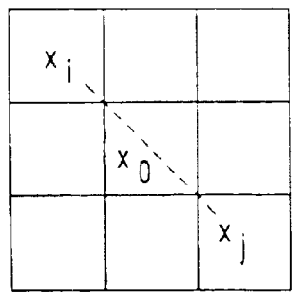
Figure 2D:
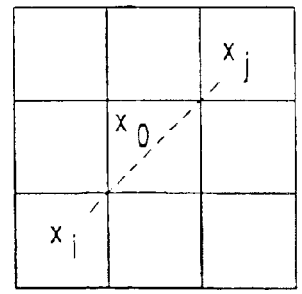

The set $x_i$, $x_j$ defines a neighborhood of the central pixel $x_0$ and is called a filter mask. The median filter replaces the value of the central pixel by the median of the values of the pixels in the filter mask. A simple mask, which is appropriate, is a 5 element X-shaped filter. Such a filter is known from Ref. [3]. In case of the 5 element X-shaped filter, the filter mask includes the central pixel $x_0$ and the pixels diagonally related to the central pixel $x_0$. These spatial directions are indicated in FIGS. 2C and 2D.

Preferably, both ideal impulsive noise (single noisy pixels), and real world impulsive-like noise (e.g., present in satellite receivers) made of horizontal one pixel wide strips rather than by single noisy pixel, are removed. Both types of noise affect only one pixel out of 5 in the X-shaped mask, so that the noisy element is easily removed by the median operator. It should be noted that one pixel wide vertical strips, which may be found in video obtained from motion picture films, can also be effectively removed by this filter. To remove wider strips, a larger support is required. Once impulsive noise type has been detected, the simple median is used.

The noise discriminator 30 controls the set of filters 31. Although in the above-described embodiments, hard switching is used, soft switching is also possible, e.g., enabling the most suitable filter of the set of filters 31 by more than 50% and, in addition, partly enabling one or more of the other filters in the set of filters 31. In an exemplary case in which the signal includes mostly Gaussian noise, the filter 310 may be enabled for 80% and the other two filters 311 and 312 for 10%. The claims should be construed as comprising such a soft switching implementation too.

Depending on the application or the image sequence, other filters or a different noise discriminator may be used.

The basic idea of the invention is to use at least two filters, designed for different types of noise, and a noise discriminator for enabling the most suitable filter of the at least two filters. The invention is also applicable to other signals, e.g., audio.

Motion-compensated based algorithms generally provide better performances at the cost of, a much more complex structure. Motion-compensated based algorithms are preferably applied in professional embodiments of the invention.

It should be noted that the above-mentioned embodiments illustrate rather than limit the invention, and that those skilled in the art will be able to design many alternative embodiments without departing from the scope of the appended claims. The word 'image' also refers to picture, frame, field, etc. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, the invention provides noise filtering of a signal by estimating a type of noise in the signal and enabling one of at least two noise filters, the enabled noise filter being a most suitable filter for the estimated type of noise. An approximation of the noise in the signal is obtained by computing a difference between the signal and a noise-filtered version of the signal. The invention uses a kurtosis of the noise as a metric for estimating the type of noise. If the estimated type of noise is long-tailed noise, a median filter is enabled to filter the signal. If the estimated type of noise is Gaussian noise or contaminated Gaussian noise, a spatio-temporal filter is enabled to filter the signal. The invention may be applied in a video system with a camera and a noise filter.

REFERENCES

[1] G. Ramponi, 'The rational filter for image smoothing', IEEE Signal Processing Letters, vol. 3, no. 3, March 1996, pp. 63–65.

[2] F. Cocchia, S. Carrato and G. Ramponi, 'Design and real-time implementation of a 3-D rational filter for edge preserving smoothing', IEEE Trans. on Consumer Electronics, vol. 43, no. 4, November 1997, pp. 1291–1300.

[3] I. Pitas and A. N. Venetsanopoulos, Non-linear digital filters, Kluwer Academic Publishers, Boston Mass.(USA), 1990, p. 63–115.

[4] E. Lloyd, Handbook of applicable mathematics, John Wiley & Sons Ltd., New York, 980, pp. 155–160.

[5] K. Konstantinides, B. Natarajan and G. S. Yovanof, 'Noise estimation and filtering using block-based singular value decomposition', IEEE Trans. on Image Processing, vol. 6, no. 3, March, 1997, pp. 479–483.

[6] B. M. Sadler, G. B. Giannakis and K-S Lii, 'Estimation and detection in nonGaussian noise uding higher order statistics', IEEE Trans. on Signal Processing, vol. 42, no. 10, October 1994, pp. 2729–2741.

[7] G. B. Giannakis and M. K. Tsatsanis, 'Signal detection and classification using matched filtering and higher order statistics', IEEE Trans. on Acousit., Speech and Signal Processing, vol. 38, no. 7, July 1990, pp. 12134–1296.

[8] S. I. Olsen, 'Estimation of noise in images: an evaluation', CVGIP, vol. 55, no. 4, July 1993, pp. 319–323.

What is claimed is:

1. A method of noise filtering a signal, the method comprising the steps of:
   estimating a type of noise in the signal; and
   enabling one of at least two noise filtering operations, the enabled noise filtering operation being a most suitable noise filtering operation for the estimated type of noise;
   wherein said enabling step comprises the sub-steps:
   enabling a median filtering operation if the estimated type of noise is long-tailed noise; and
   enabling a spatio-temporal rational filtering operation if the estimated type of noise is Gaussian noise or contaminated Gaussian noise;
   wherein the sub-step of enabling a spatio-temporal rational filtering operation comprises the further sub-steps:
   enabling a first spatio-temporal rational filtering operation if the estimated type of noise is Gaussian noise; and
   enabling a second spatio-temporal rational filtering operation if the estimated type of noise is contaminated Gaussian noise, and wherein the first spatio-temporal rational filtering operation takes into account at least one temporal direction, and the second spatio-temporal rational filtering operation takes into account at least one combination of a temporal direction and a spatial direction.

2. The method of noise filtering as claimed in claim 1, wherein:
   a kurtosis of the noise is used as a metric for estimating the type of noise;
   the median filtering operation is enabled if the kurtosis is above a first threshold;
   the first spatio-temporal rational filtering operation is enabled if the kurtosis is below a second threshold, said second threshold being lower than said first threshold; and
   the second spatio-temporal rational filtering operation is enabled if the kurtosis is above the second threshold and below the first threshold.

3. The method of noise filtering as claimed in claim 2, wherein the first threshold is about 15 and the second threshold is about 6.

4. The method of noise filtering as claimed in claim 1, wherein in said noise estimating step, the noise in the signal is estimated by a difference between the signal and a noise-filtered version of the signal.

5. The method of noise filtering as claimed in claim 4, wherein the noise-filtered version of the signal is obtained by subjecting the signal to a median filtering operation.

6. A method of noise filtering a signal, the method comprising the steps of:
   estimating a type of noise in the signal; and
   enabling one of at least two noise filtering operations, the enabled noise filtering operation being a most suitable noise filtering operation for the estimated type of noise;
   wherein said enabling step comprises the sub-steps:
   enabling a median filtering operation if the estimated type of noise is long-tailed noise; and
   enabling a spatio-temporal rational filtering operation if the estimated type of noise is Gaussian noise or contaminated Gaussian noise;
   and wherein:
   a kurtosis of the noise is used as a metric for estimating the type of noise;
   the median filtering operation is enabled if the kurtosis is above a first threshold; and
   the spatio-temporal rational filtering operation is enabled if the kurtosis is below said first threshold.

7. The method of noise filtering as claimed in claim 6, wherein in said noise estimating step, the noise in the signal is estimated by a difference between the signal and a noise-filtered version of the signal.

8. The method of noise filtering as claimed in claim 7, wherein the noise-filtered version of the signal is obtained by subjecting the signal to a median filtering operation.

9. A device for noise filtering a signal, the device comprising:
   means for estimating a type of noise in the signal;
   a median filter for filtering said signal;
   a first spatio-temporal rational filter and a second spatio-temporal rational filter for filtering said signal; and
   means for enabling one of said median filter and said first and second spatio-temporal rational filters, the enabled filter being a most suitable filter for the estimated type of noise;
   wherein said enabling means:
   enables said median filter if the estimated type of noise is long-tailed noise;
   enables said first spatio-temporal rational filter if the estimated type of noise is Gaussian noise; and
   enables said second spatio-temporal rational filter if the estimated type of noise is contaminated Gaussian noise;
   and wherein the first spatio-temporal rational filter takes into account at least one temporal direction, and the second spatio-temporal rational filter takes into account at least one combination of a temporal direction and a spatial direction.

10. A video system comprising:
    means for obtaining an image sequence; and
    a device as claimed in claim 9 for noise filtering the image sequence.

11. A device for noise filtering a signal, the device comprising:
    means for estimating a type of noise in the signal;
    a median filter for filtering said signal;
    a spatio-temporal rational filter; and
    means for enabling one of said median filter and said spatio-temporal rational filter, the enabled filter being a most suitable filter for the estimated type of noise;
    wherein said enabling means enables said median filter if the estimated type of noise is long-tailed noise, and enables said spatio-temporal rational filter if the estimated type of noise is Gaussian noise or contaminated Gaussian noise;
    wherein said estimating means uses a kurtosis of the noise as a metric for estimating the type of noise, and wherein said enabling means:
    enables said median filter if the kurtosis is above a first threshold; and
    enables said spatio-temporal rational filter if the kurtosis is below said first threshold.

12. A video system comprising:
    means for obtaining an image sequence; and
    a device as claimed in claim 11 for noise filtering the image sequence.

* * * * *